May 13, 1958
C. L. ROMRELL
2,834,251
STEREOSCOPIC VIEWER AND RECTANGULAR VIEW MOUNTING CARD
Filed June 5, 1953
3 Sheets-Sheet 1
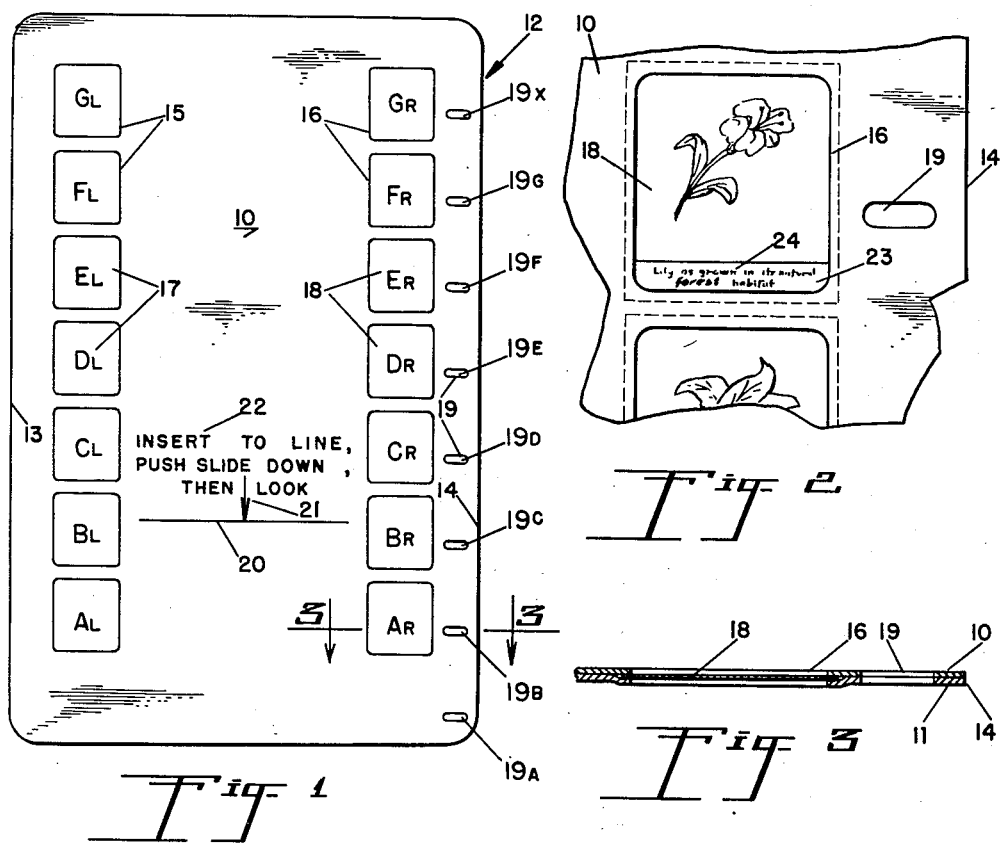
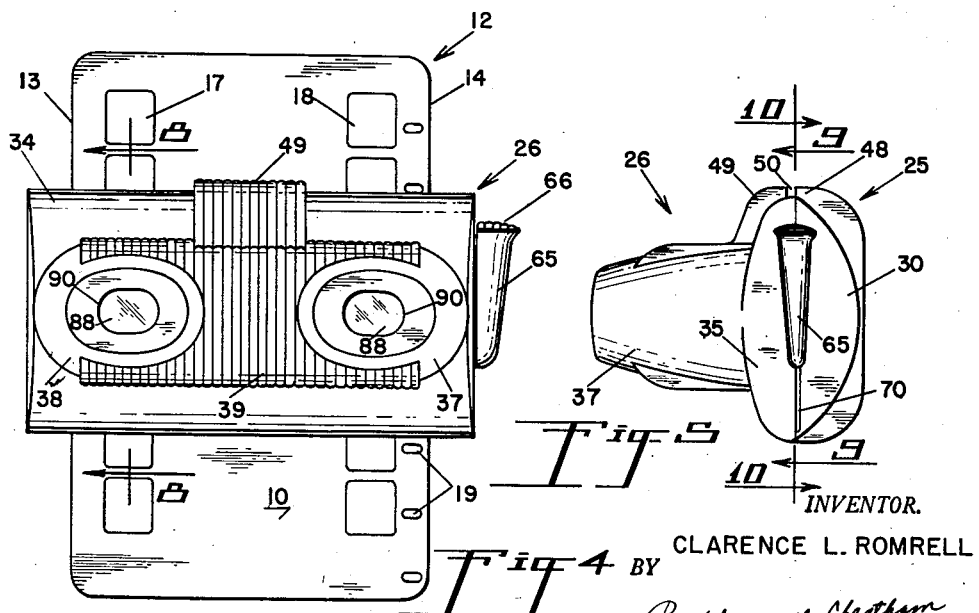
INVENTOR.
CLARENCE L. ROMRELL
BY
ATTORNEY May 13, 1958 C. L. ROMRELL 2,834,251
STEREOSCOPIC VIEWER AND RECTANGULAR VIEW MOUNTING CARD
Filed June 5, 1953 3 Sheets-Sheet 2
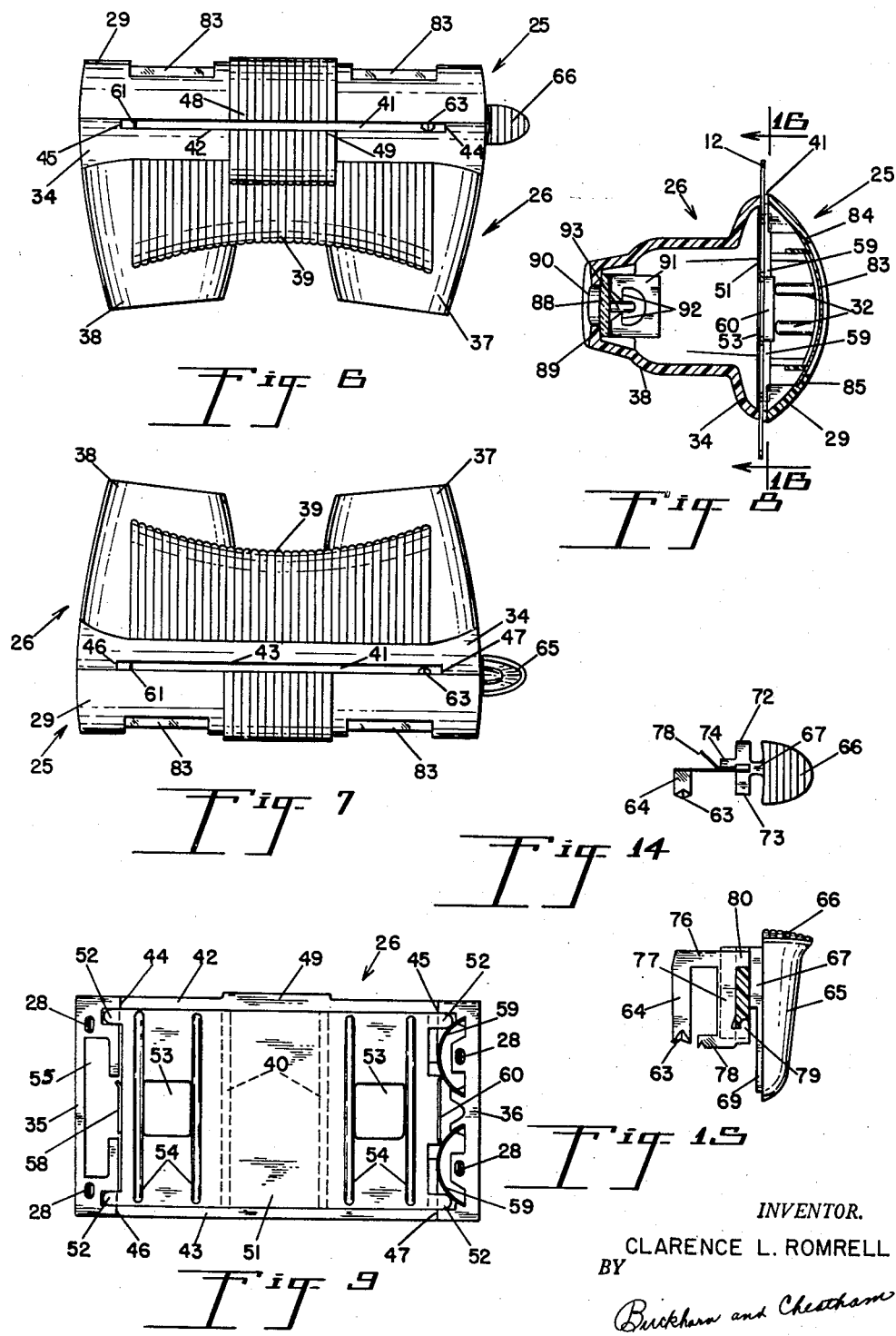
INVENTOR.
CLARENCE L. ROMRELL
BY
Burkham and Cheatham
ATTORNEY

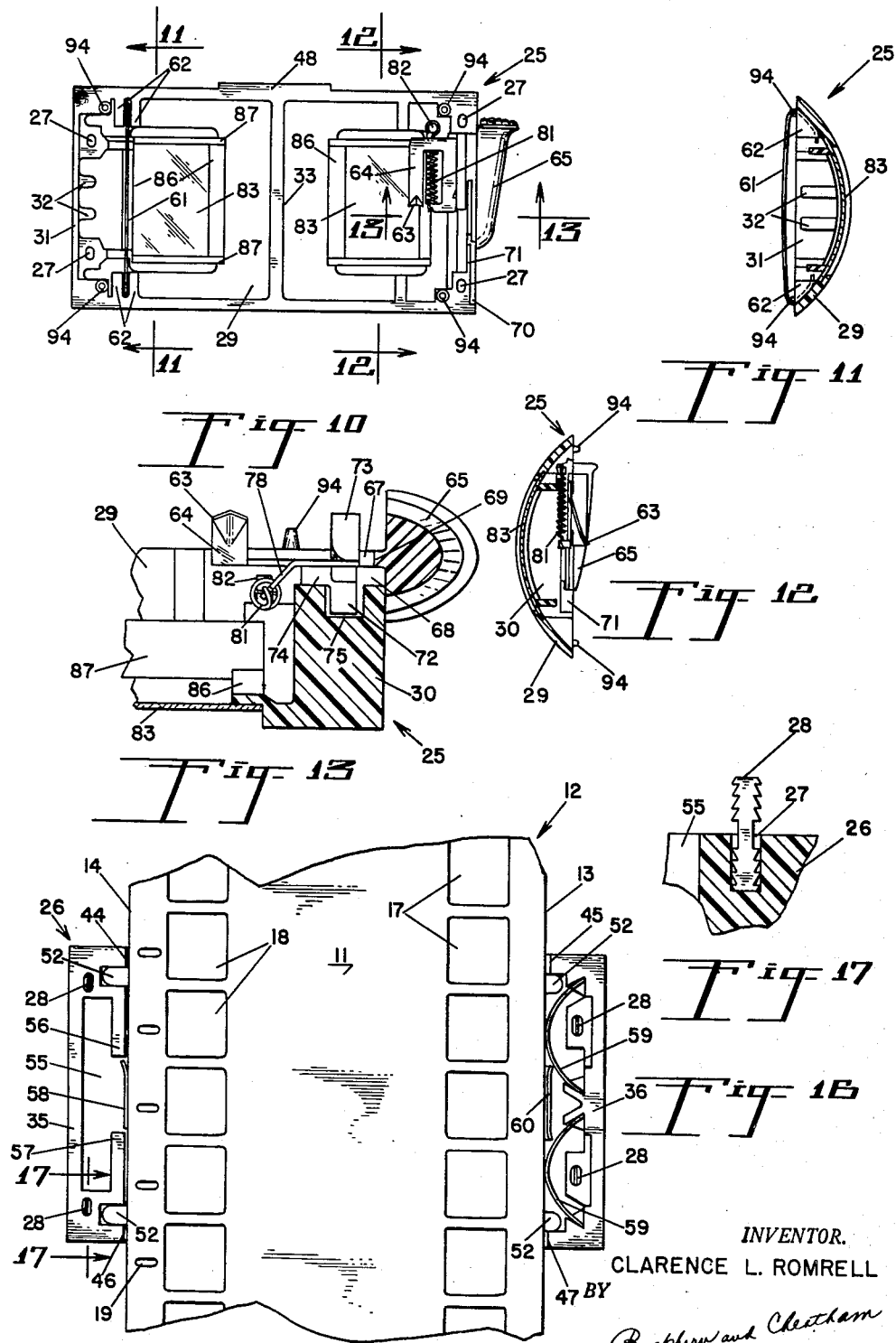

United States Patent Office 2,834,251
Patented May 13, 1958

2,834,251

STEREOSCOPIC VIEWER AND RECTANGULAR VIEW MOUNTING CARD

Clarence L. Romrell, Portland, Oreg., assignor to Sawyer's Inc., Progress, Oreg., a corporation of Oregon Application June 5, 1953, Serial No. 359,866

2 Claims. (Cl. 88—31)

My present invention comprises an improvement in stereoscopic viewers and view mounting cards for use therein. The principal object of the present invention is to provide a viewer which may be operated by very young children and other persons of limited mentality or mechanical ability.

A further object of the present invention is to provide a stereoscopic viewer at a minimum expense, which, while thus being within the category of toys for children, nevertheless presents stereo-paired transparencies to viewing position in a correct manner so that clarity is achieved and eyestrain is avoided.

A further object of the present invention is to provide a stereoscopic viewer, of the type for reception of elongated view mounting cards, with feeding means and related guiding means whereby successive actuation of the feeding means presents successive stereo-pairs of transparencies to viewing position without having the card become bound or jammed in the viewer.

A further object of the present invention is to provide a viewer of the character described with feeding means comprising a reciprocable slide including a manually engageable portion which is easily engaged and operated without removing the viewer from viewing position in alignment with the eyes of the observer, feeding actuation being easily accomplished by a person having very small hands and without releasing his grip on the viewer.

The foregoing and other objects and advantages of the present invention will be more readily ascertained from inspection of the accompanying drawing taken in connection with the following specification wherein like numerals refer to like parts throughout.

In the drawings,

Fig. 1 is a plan view of the obverse face of a mounting card having a plurality of stereo-paired transparencies mounted therein;

Fig. 2 is an enlarged view of a portion of the card shown in Fig. 1;

Fig. 3 is an enlarged, vertical section through a portion of the card taken substantially along line 3—3 of Fig. 1;

Fig. 4 is a rear view of the viewer having the card mounted therein;

Fig. 5 is a view of the right side of the viewer;

Fig. 6 is a plan view of the viewer;

Fig. 7 is a bottom view of the viewer;

Fig. 8 is a vertical section taken substantially along the line 8—8 of Fig. 4;

Fig. 9 is a vertical section taken substantially along the line 9—9 of Fig. 5;

Fig. 10 is a vertical section taken substantially along the line 10—10 of Fig. 5;

Fig. 11 is a vertical section taken substantially along the line 11—11 of Fig. 10;

Fig. 12 is a vertical section taken substantially along the line 12—12 of Fig. 10;

Fig. 13 is an enlarged, horizontal section taken substantially along line 13—13 of Fig. 10;

Fig. 14 is a top view of the feeding means separated from the viewer;

Fig. 15 is a side view of the feeding means with a portion broken away;

Fig. 16 is an enlarged, vertical section taken substantially along line 16—16 of Fig. 8; and Fig. 17 is an enlarged, vertical section taken substantially along line 17—17 of Fig. 16.

The mounting card of the present invention comprises an upper lamination 10 and a lower lamination 11, each preferably formed of smoothly finished, printable, thin, fiber board, the two being adhered to each other substantially throughout their contiguous surfaces to form a substantially rigid, yet somewhat flexible mounting card 12. The card is elongated to the extent necessary, but its sole essential requisite is that it should have linear side edges 13 and 14 which are parallel to each other within close tolerances, the side edges being parallel to the axis of elongation of the card. The corners of the card are preferably rounded to facilitate insertion into the viewer. The card is provided with a plurality of substantially rectangular windows 15 arranged in a vertical line parallel to and closely adjacent the side edge 13 and a similar pair of windows 16 arranged adjacent the side edge 14. A plurality of left transparencies 17 are mounted in the windows 15 and a plurality of right transparencies 18 are mounted in the windows 16, each pair of transparencies being parallel to the transverse axis of the card with their centers substantially coinciding with a line normal to the side edges 13 and 14. The pairing of the views is indicated by the letters in Fig. 1, $A_R$ to $G_R$ inclusive, indicating the first to the seventh right transparencies, and $A_L$ to $G_L$ inclusive, indicating the first to the seventh left transparencies. The transparencies are positioned on one lamination with their edges overlapping the edges of the window openings and sealed in position when the other lamination is superimposed and the adhesive therebetween set. The centers of the right and left transparencies are spaced apart the average human interpupillary distance so that a pair of eyepiece lenses in alignment therewith may be placed adjacent the eyes and the view seen in three dimension on an enlarged scale. There may be a lesser or greater number of pairs of transparencies but seven pairs are sufficient to illustrate a simple story or to show representative scenes of a locality, and a card capable of mounting more than seven pairs would be awkwardly long. A card of the dimensions illustrated, for mounting seven pairs of transparencies, may be stored in a box of reasonable dimensions and will not project from the viewer to an unreasonable extent when the card is being used.

The card is provided with a longitudinally arranged row of feeding apertures 19 in the marginal area between the right transparencies 18 and the right edge 14. There are a plurality of such feeding apertures, preferably one more than the number of stereo-paired transparencies. The feeding apertures utilized to position each pair in viewing position are designated by the symbols 19A to 19G inclusive, from which it will be seen that the feeding aperture for a particular view is offset below the transverse axis of the transparencies. For this reason the lower end of the card is extended beneath the first pair of transparencies to an extent sufficient to accommodate the lowermost feeding aperture, the same being provided for the additional reason that the right edge 14 of the card extends to a considerable distance below the first pair of transparencies for locating purposes as will be explained later. The extra feeding aperture at the top of the card, designated by the symbol 19X, is provided to feed the blank upper portion of the card into the viewing zone so that the operator will be informed that the series of views have been observed, without the necessity of counting the views.

The surface of the lamination 10 is preferably imprinted with a horizontally disposed insertion guide line 20 indicating the extent to which the card should be inserted prior to operating the feeding means, an insertion direction arrow 21, and a legend 22 instructing as to the use of the card.

Preferably each of the transparencies 18 is provided with a lower, legend-bearing portion 23 upon which appears a legend 24 indicative of the scene or the conversation or action of the plot. Preferably the legend comprises white letters on a black background so as to avoid glare. By having the legend appear upon the scene being viewed the necessity for providing a separate pamphlet giving a synopsis or description is eliminated. The present invention is aimed principally at small children who can read simple sentences but would be unlikely to correlate a separate pamphlet or booklet with the individual views, and who would be prone to lose any such separate printed matter. Likewise, the juxtapositioning of the legend and the scene eliminates the necessity for removing the viewer from the eyes in order to read a separate caption appearing in a separate, centrally disposed window as is done in other types of viewers, and results in a corresponding simplification of the viewer itself.

The viewer of the present invention comprises a hollow housing, cast or molded in two parts, the parts preferably being formed of moldable lightweight plastic. The housing comprises a forward part 25 and a rearward part 26, the two parts meeting along a vertical parting plane. Each part is provided with a plurality of fastener receiving sockets 27 extending perpendicularly to the parting plane and into which the opposed ends of pronged strip fasteners 28 may be forced to hold the two parts in assembled relation. The housing is thus held together without visible fastening means which might tempt young mechanics to take it apart, but a knife blade may be inserted therebetween to separate the parts for repair of the interior mechanism. The prongs of the strip fasteners grip the sides of the sockets, but may be separated and replaced a plurality of times without materially reducing their holding efficiency.

The forward part 25 comprises an outwardly convex front wall 29, a right end wall 30, and a left end wall 31. The right end wall 30 is of considerable thickness in order to provide a rigid structure in which guide grooves are formed, and the left end wall is thin and internally braced by ridges 32 and the bosses in which the sockets 27 are located. A vertical rib 33 spans the interior and divides it into two parts. The rear housing part 26 comprises a complementary part having an edge outline similar to the edge outline of the front part and includes a rear wall 34, a right end wall 35 and a left end wall 36. The rear wall 34 extends rearwardly to provide a right viewing tunnel 37 and a left viewing tunnel 38 separated to accommodate the bridge of the nose and strengthened by a connecting bridge 39. The interior of the rear housing part is provided with a pair of laterally spaced vertical ribs 40 which cooperate with the rib 33 in separating the instrument into a pair of light transmitting interior passages. The tunnels 37 and 38 are of minimum height so that the instrument may be easily grasped in small hands. The bridge 39 and the upper and lower surfaces of the tunnels are ribbed to facilitate firm holding and for decorative purposes, and a portion of the front wall 29 is similarly ribbed for decorative purposes.

The viewer is provided with a vertical, transverse slot 41 extending along the parting line, the front of the slot being defined by the upper and lower edges of the curved front wall 29 and by the central rib 33. The rear upper and lower edges of the slot are defined by an upper recess 42 in the upper edge of the wall 34 and a lower recess 43 in the lower edge of the wall 34. The ends of the recess 42 are defined by shoulders 44 and 45 spaced apart slightly greater than the width of the card and the ends of the recess 43 are defined by respectively aligned shoulders 46 and 47. The ribbed central portion of the front wall 49 extends above the remainder of the upper edge thereof to provide a forward wall 48, and a central ribbed portion of the rear wall 34 is extended upwardly above the remainder thereof to provide a rearward wall 49, of an extension 50 of the slot 41. Insertion of the card is thus facilitated since the lower edge of the card may be flipped across the top of the instrument and will easily slip into the slot extension. The card is shoved downwardly between the shoulders 44 and 45, entry thereof being facilitated by the rounded corners of the card.

The card is guided through the slot 41 by means including a backing plate 51 having its forward surface substantially flush with the lateral surfaces of the recesses 42 and 43, the backing plate 51 being preferably formed of thin sheet metal. The backing plate rests in part on the vertical ribs 40 and is supported at its ends by four laterally extending corner tabs 52 which are closely confined in niches in the end walls of the rear housing part 26. The backing plate is provided with a pair of rectangular windows 53 with which the transparencies are registered for viewing. Each window is flanked by a pair of embossed, raised ridges 54 extending vertically alongside the vertical edges of the windows and providing antifriction means to keep the card moving easily through the slot, the ribs also serving to stiffen the backing plate. The backing plate is held in position by a plurality of lugs 94 extending rearwardly from the corners of the front housing part in position to engage the corner tabs 52.

The thick end wall 35 is longitudinally recessed to provide a slide retaining groove 55 in which is engaged a portion of a slide as will appear. The inner wall of the groove 55 is only a partial wall, being defined by an upper flange 56 and a lower flange 57. A fixed card guiding flange 58, comprising a bent tab on one vertical edge of the backing plate 51 is mounted between the opposed ends of the flanges 56 and 57. The forward surfaces of the flanges 56 and 57 and of the guide 58 lie in the parting plane so that they all may engage the side edge 14 of the card as it is being traversed through the slot. The card-engaging surface of the guide 58 is relatively long, centrally disposed between the top and bottom of the viewer and is positioned inwardly from the inner surfaces of the flanges 56 and 57 a few thousandths of an inch. The upper end of the guide 58 is flared outwardly so as not to interfere with insertion of the card. The guide 58 is of sufficient length in the vertical sense that pressure against portions of the opposite edge 13 will tend to align the card so that its transverse axis will be in parallelism with the transverse axis of the viewing instrument. The desired pressure is provided by a pair of resilient locating springs 59 mounted on the opposite wall 36. Each of the springs comprises a leaf spring which is retained in inwardly bowed position by slipping its ends into angular niches molded into the wall 36. A second guide tab 60 on the opposite edge of the backing plate spans the gap between the springs to prevent canting of the card when it is being inserted.

The shoulders 44, 45, 46 and 47, the flanges 56 and 57, and the guide tab 60 are rough locating means defining the vertical edges of the slot 41. The rough locating means prevent the card from being cocked or jammed in the interior of the viewer when it is being inserted or fed stepwise to present pairs of transparencies to the viewing position. The fixed, central, vertical guide 58 and the vertically spaced upper and lower locating springs 59 project inwardly beyond the rough guides and position the card for proper viewing, the springs 59 normally extending inwardly so as to be closer to the inner surface of the fixed guide 58 than the spacing between the edges 13 and 14 of the card. Therefore each of the springs must be bowed slightly to accommodate the card, and the springs resiliently hold the card against the fixed guide 58. Thus even though the card should be slightly canted as a result of the feeding action, it will be realigned upon disengagement of the feeding means. This action is of importance since it tends to keep the views in orientation with the eyepieces and thus eliminates eyestrain. If the card were allowed to assume any position within the limits of the rough guides, one view might be canted in one sense, and the successive view canted in the opposite sense, which occasions severe eyestrain as the eyes adjust to focus on the scenes.

The forward surface of the card is engaged along its opposite marginal areas between the transparencies and the vertical edges of the card by resilient means tending to hold the card against the ridges 54 on the backing plate. The resilient means at the left side of the viewer comprises a bowed wire spring 61, the upper and lower ends of which are curled forwardly and inwardly toward each other and retained between pairs of vertically disposed lugs 62 on the inner surface of the front wall 29. The intermediate portion of the wire spring 61 engages the marginal strip of the card in the vertical direction between the transparencies 17 and the edge 13. The rounded surface of the wire permits slippage of the surface of the card so as not to interfere with the orienting action of the locating springs 59.

The opposite edge of the card is pressed rearwardly by a feeding claw 63 formed at the end of a vertically disposed feeding claw arm 64 comprising a portion of the reciprocating, feeding slide. The tip of the feeding claw is dished rearwardly so that it will snap into the feeding apertures 19. The feeding claw is maintained at rest adjacent the fixed guide 58 so that it does not interfere with the action of the locating springs 59. It also does not positively engage the lateral edges of the feeding apertures so that shifting of the card by the locating springs is permitted. The claw is adapted to be moved vertically the distance of the spacing of the feeding apertures so as to successively present stero-paired views to viewing position.

The card feeding means comprises a molded plastic slide 65 which is elongated in the vertical sense and partially covers the parting line at the right side of the instrument, the slide being provided with a ribbed upper surface 66 for engagement by the finger. The slide comprises a vertically extending bridge portion 67 which extends inwardly through a vertical slot 68 along the parting line provided by recessing the edge of the end wall 30. The bridge portion 67 extends from a point near the ribbed surface 66 to a point less than halfway down the inner surface of the outwardly projecting portion of the slide, but a guide rib 69 extends downwardly therefrom to a point near the lower end of the slide. The guide rib is engaged in a vertical guide groove 70 in the lower portion of the outer vertical surface of the wall 30 adjacent the parting line. The inner surface of the upper portion of the guide groove 70 is defined by a thin, light-trapping flange 71 constantly overlapping a portion of the slide 65 so as to prevent distracting light from entering the interior of the viewer.

The bridge portion 67 comprises one arm of an integral crosshead portion of the slide including a forward arm 72, a rearward arm 73, and an inner arm 74. All three of the arms are of substantially the same length in the vertical sense, extending from a point near the ribbed surface 66 to about the midpoint of the slide, some distance below the lower edge of the bridge portion 67. The rearward arm 73 projects into the slide-retaining groove 55 in the end wall 35 of the rear part 26, and the forward arm 72 projects into a similar slide-retaining groove 75 in the wall 30 of the forward part 25. Considerable latitude is permitted between the surfaces of the arms 72 and 73 and their respective retaining grooves, since guidance of the reciprocating movement is derived from engagement of other parts, such as the guide rib 69 engaging the guide groove 70. The inner arm 74 engages the upper surface of the end wall 30 inwardly from the retaining groove 75 and provides one of the guiding surfaces. Reciprocating movement of the slide is limited by the ends of the arms 72 and 73 engaging the ends of the retaining grooves 55 and 75.

The spring plate providing the resilient feed claw arm 64 is formed in the shape of an open rectangle including the vertically extending feed claw arm 64, an upper horizontal connecting bar 76, a vertically extending inner bar portion 77 and a laterally extending spring-retaining arm 78 at the bottom. The inner bar portion 77 rests on the rear surface of the inner arm 74 of the crosshead on the slide. A hook 79 thereon engages a niche in the lower end of the crosshead, and a tab 80 at the upper end thereof engages a vertical slot in the upper end thereof. A spiral spring 81 tensioned between a hook at the tip of the spring-retaining arm 78 and an anchoring lug 82 on the upper portion of the front wall 29 retains the hook 79 in its niche and forces the tab 80 into its niche. The arm 78 is bent forwardly so that the spring 81 may extend beneath the connecting portion 76, and so that the spring maintains the inner arm 74 in engagement with the guiding surface on the wall 30. Reciprocation of the slide is manually accomplished by pressing downwardly on the ribbed surface 66, and return of the feeding slide is automatically accomplished by the spring 81. It is to be noted that the ribbed surface 66 is easily within reach of the index finger of a small right hand gripping the right side of the viewer, and the operator need not remove the viewer from viewing position, or awkwardly reach around the viewer in any manner in order to accomplish feeding movements.

Light is admitted to the interior of the housing through a pair of window openings in general alignment with the openings 53 in the backing plate and in which are mounted a pair of frosted window panes 83. The window panes are preferably formed of a translucent, milky, flexible plastic which may be flexed in order to assume a convex shape in concurrence with the forward wall 29. As seen most clearly in Fig. 8, the window pane is considerably larger than the opening 53 in the backing plate and extends to some substantial distance above and below the opening 53 so as to admit a large amount of light and to collect light from overhead sources and reflective surfaces below the viewer. Thus in most cases there is no necessity for the operator craning his neck in order to direct the viewer toward a lamp or other source of light. Each windowpane is held in position by external flanges 84 and 85 at the top and bottom of the opening, respectively, internal flanges 86 at the sides of the window opening, and transverse internal bridges 87 adjacent the upper and lower external flanges. The windowpane is light-sealed to the front of the housing since its upper and lower edges respectively underlie the flanges 84 and 85, and the internal flanges 86 underlie its side edges.

The illuminated transparencies are viewed through magnifying eyepiece lenses 88 held against the interior surface of flanges 89 defining the eyepiece openings 90 at the rearward ends of the viewing tunnels. The eyepiece lenses and openings are preferably oval with their major axes lying along a transverse line so that the viewer may be used by persons having wider or narrower than normal eye spacing. Molded clear plastic lenses are of sufficient accuracy and magnifying power for the purpose. The lenses are held in position by spring clips 91 (Fig. 8), each comprising a U-shaped, rectangular, flat spring adapted to be slipped into the viewing tunnel and having a central aperture corresponding to the eyepiece opening 90. The aperture is extended into the legs of the clip and the inner edges thereof are provided with inwardly facing retaining claws 92 which grip the opposite surfaces of ribs 93 on the interior surface of the tunnel.

Having illustrated and described a preferred embodiment of my invention, it shoud be apparent to those skilled in the art that the same permits of modification

I claim:

1. A stereoscopic viewer for viewing stereo-paired transparencies mounted in an elongated holder having parallel side edges with the transparencies in two parallel in two parallel rows adjacent the respective side edges of the holder and said holder having a row of feeding apertures arranged in a row parallel to said side edges, comprising a housing, a laterally spaced pair of eyepiece lenses at the rear of said housing, a laterally spaced pair of light admitting windows at the front of said housing, guide means defining a transverse slot extending through said housing from top to bottom thereof and in which a holder may be maintained with the rows of transparencies in alignment with the respective lenses and windows, said guide means having openings therethrough with which the stereo-pairs of transparencies may be registered successively for viewing purposes, reciprocable feeding means guided for vertical sliding movement in said housing and including a feeding claw engageable successively with said feeding apertures, said guide means defining a slot of greater width than the distance between the side edges of said holder and serving roughly to locate said holder in said housing, and orienting means mounted in said housing and engaging the side edges of the inserted holder comprising a fixed guide extending vertically, a short distance above and below the transverse axis of the viewer through the optical centers of said eyepiece lenses, at one side of said slot for engagement with one side edge of said holder, and resilient guide means engaging the other side edge of said holder for pressing said one side edge against said fixed guide in order to orient the transverse axis of each stereo-pair of transparencies parallel to the transverse axis of the viewer through the optical centers of said eyepiece lenses, said resilient guide means comprising a pair of vertically spaced leaf springs projecting inwardly beyond the adjacent side of the slot, one above and the other below said transverse axis of the viewer so as to engage the edge of the card at a pair of spaced points respectively above and below said transverse axis of the viewer, each of said leaf springs comprising an inwardly bowed leaf spring having its ends directed outwardly away from the slot, and said housing comprising means forming niches in which said leaf spring ends are maintained.

2. A stereoscopic viewer for viewing stereo-paired transparencies mounted in an elongated holder having parallel side edges with the transparencies in two parallel rows adjacent the respective side edges of the holder and said holder having a row of feeding apertures arranged in a row parallel to and adjacent one of said rows of transparencies, comprising a housing, a laterally spaced pair of eyepiece lenses at the rear of said housing, a laterally spaced pair of light admitting windows at the front of said housing, guide means defining a transverse slot extending through said housing from top to bottom thereof and in which a holder may be maintained with the rows of transparencies in alignment with the respective lenses and windows, reciprocable feeding means guided for vertical sliding movement in said housing and including a feeding claw engageable successively with said feeding apertures, said guide means defining a slot of greater width than the distance between the side edges of said holder and serving roughly to locate said holder in said housing, orienting means mounted in said housing and engaging the side edges of the inserted holder comprising a fixed guide at one side of said slot for engagement with one side edge of said holder, and resilient guide means engaging the other side edge of said holder for pressing said one side edge against said fixed guide in order to orient the transverse axis of each stereo-pair of transparencies parallel to the transverse axis of the viewer through the optical centers of said eyepiece lenses, said guide means comprising a backing plate extending from top to bottom and from side to side of said slot in position to engage one surface of said holder, and means engageable with the opposite surface of said holder to maintain said holder against said backing plate comprising a resilient arm mounting said feeding claw and forming a portion of said feeding means and a vertical, bowed wire spring engaging the holder alongside the other row of transparencies.

References Cited in the file of this patent

UNITED STATES PATENTS

| | | |
|---|---|---|
| 1,736,071 | Cressler | Nov. 19, 1929 |
| 2,132,670 | Young | Oct. 11, 1938 |
| 2,292,312 | Wittel et al. | Oct. 4, 1942 |
| 2,296,765 | Brost | Sept. 22, 1942 |
| 2,326,718 | Mast | Aug. 10, 1943 |
| 2,511,334 | Gruber | June 13, 1950 |
| 2,571,584 | Kurz | Oct. 16, 1951 |
| 2,627,781 | Welborn | Feb. 10, 1953 |
| 2,674,920 | Bennett | Apr. 13, 1954 |

FOREIGN PATENTS

| | | |
|---|---|---|
| 459,113 | Italy | Aug. 25, 1950 |
| 461,795 | Italy | Feb. 14, 1951 |
| 651,333 | Great Britain | Mar. 14, 1951 |